US011182755B2

United States Patent
Panigrahi et al.

(10) Patent No.: US 11,182,755 B2
(45) Date of Patent: Nov. 23, 2021

(54) APPARATUS AND METHOD FOR TRANSACTION HANDOFF AND COMPLETION

(71) Applicant: TOAST, INC., Boston, MA (US)

(72) Inventors: Toshit Panigrahi, Nashua, NH (US); Tiea I. O'Connell, Charlestown, MA (US)

(73) Assignee: Toast, Inc., Boston, MA (US)

( * ) Notice: Subject to any disclaimer, the term of this patent is extended or adjusted under 35 U.S.C. 154(b) by 0 days.

(21) Appl. No.: 16/731,898

(22) Filed: Dec. 31, 2019

(65) Prior Publication Data

US 2021/0201277 A1    Jul. 1, 2021

(51) Int. Cl.
| | | |
|---|---|---|
| *G06Q 20/10* | (2012.01) | |
| *G06Q 20/32* | (2012.01) | |
| *G06Q 20/20* | (2012.01) | |
| *G06Q 50/12* | (2012.01) | |
| *G06Q 20/04* | (2012.01) | |

(52) U.S. Cl.
CPC ......... *G06Q 20/102* (2013.01); *G06Q 20/047* (2020.05); *G06Q 20/20* (2013.01); *G06Q 20/3223* (2013.01); *G06Q 20/3276* (2013.01); *G06Q 20/3278* (2013.01); *G06Q 50/12* (2013.01)

(58) Field of Classification Search
None
See application file for complete search history.

(56) References Cited

U.S. PATENT DOCUMENTS

| | | |
|---|---|---|
| 8,770,478 B2 | 6/2014 | Priebatsch |
| 8,924,260 B1 | 12/2014 | Priebatsch |
| 9,530,289 B2 | 12/2016 | Priebatsch |
| 9,741,026 B1 | 8/2017 | Grassadonia et al. |
| 2006/0253389 A1 | 11/2006 | Hagale et al. |
| 2008/0319905 A1 | 12/2008 | Carlson |
| 2009/0281948 A1 | 11/2009 | Carlson |
| 2011/0112898 A1 | 5/2011 | White |
| 2011/0246284 A1 | 10/2011 | Chaikin et al. |
| 2011/0251892 A1 | 10/2011 | Laracey |
| 2013/0018779 A1 | 1/2013 | Laquerre et al. |
| 2013/0159446 A1 | 6/2013 | Carlson et al. |
| 2013/0238455 A1 | 9/2013 | Laracey |
| 2013/0256403 A1 | 10/2013 | MacKinnon Keith |
| 2015/0332223 A1 | 11/2015 | Aaron et al. |
| 2015/0356548 A1 | 12/2015 | Luna-Rodriguez et al. |

(Continued)

*Primary Examiner* — Joseph W. King
(74) *Attorney, Agent, or Firm* — Richard K. Huffman; Huffman Patent Group, LLC

(57) ABSTRACT

A system for handoff of a transaction for completion is provided, the system having a point-of-sale terminal and a server. The point-of-sale terminal is configured to employ a token with the server to perform the handoff of the transaction for completion on a guest device, where communications between the point-of-sale terminal and the server are transmitted and received through a gateway device that is collocated with the point-of-sale terminal. The server is configured to transmit details of the transaction for display on the guest device, and is configured to receive transaction completion data provided by the guest device, and is configured to notify the guest device and the point-of-sale terminal that the transaction is complete, where the server is not collocated with the point-of-sale terminal.

20 Claims, 9 Drawing Sheets

(56) References Cited

U.S. PATENT DOCUMENTS

| | | | |
|---|---|---|---|
| 2017/0236189 A1* | 8/2017 | Srinath | G06Q 30/0185 |
| | | | 705/26.81 |
| 2018/0204204 A1* | 7/2018 | Giraudo | G06Q 30/0633 |
| 2018/0336636 A1 | 11/2018 | Jibowu et al. | |
| 2019/0005529 A1 | 1/2019 | Lee et al. | |
| 2020/0162503 A1 | 5/2020 | Shurtleff et al. | |
| 2020/0279245 A1 | 9/2020 | Venkat et al. | |
| 2020/0410500 A1 | 12/2020 | Dorogusker | |

\* cited by examiner

*DEVICE HANDOFF FOR TICKET COMPLETION VIA PAYMENT PRESENTATION*

DEVICE HANDOFF FOR TICKET COMPLETION VIA TOKEN AND LINK

DEVICE HANDOFF FOR TICKET COMPLETION VIA TOKEN AND WEB SERVICE

APPARATUS AND METHOD FOR TRANSACTION HANDOFF AND COMPLETION

CROSS-REFERENCE TO RELATED APPLICATIONS

This application is related to the following co-pending U.S. patent applications, each of which has a common assignee and common inventors, the entireties of which are herein incorporated by reference.

| SERIAL NUMBER | FILING DATE | TITLE |
|---|---|---|
| 16/731,752 | 12/31/2019 | APPARATUS AND METHOD FOR IMPROVED PAYMENT EXPERIENCE |
| 16/731,799 | 12/31/2019 | SYSTEM FOR RESOLVING POOR PATRON EXPERIENCE |
| 16/731,827 | 12/31/2019 | VIRTUAL GUEST FACING DISPLAY |
| 16/731,845 | 12/31/2019 | APPARATUS AND METHOD FOR TRANSACTION COMPLETION |
| 16/731,874 | 12/31/2019 | APPARATUS AND METHOD FOR WEB-ENABLED TRANSACTION COMPLETION |

BACKGROUND OF THE INVENTION

Field of the Invention

This invention relates in general to the field of retail operations, and more specifically to methods and apparatus for improved transaction processing.

Description of the Related Art

It is rare these days to walk into a retail store or restaurant that has a manually operated cash register along with manual (i.e., paper and pencil) order entry. Rather, it is more common to find one or more electronic point-of-sale terminals through which a patron may order goods and/or services. Whether the terminals are employed in a fixed position (such as a self-serve or attended kiosk) or hand carried by wait staff, the advantages over prior manual entry mechanisms are pronounced and include more accurate presentation of goods and services, accurate and up to date pricing, automated transmission of orders for fulfillment, and automated payment processing.

Yet, as one skilled in the art will appreciate, it is often the payment step of a transaction that becomes a service bottleneck, and this disclosure is provided to address several limitations of present-day payment techniques which are most notably associated with the use of electronic devices for payment processing. Whereas in the past, wait staff would provide a printed ticket to a guest and would leave the guest in solitude to judge the service, indicate a tip amount, provide comments (if any), sign the check, and leave, such solitude is not provided for when electronic devices are employed for transaction processing. Rather, a staff member presents the electronic device to the guest and then waits for the guest to enter a tip amount, feedback, and electronic signature on the device before returning it to the staff member. As one skilled in the art will also appreciate, such hovering about the service area is both awkward at best and does not provide an atmosphere that is conducive of productive feedback.

Another issue with the transfer of electronic devices to guests is cleanliness. While a guest might not mind passing a credit card to a staff member for payment, they may be very disinclined to handle a device that may have been handled by, say, fifty previous guests.

Therefore, what is needed is a method and apparatus that enables a guest to complete a transaction in a retail establishment that does not require the guest to handle or manipulate an electronic point-of-sale terminal.

What is also needed is a technique for handing off completion of a transaction from a point-of-sale terminal to a smart device that belongs to a guest who initiated a corresponding order.

SUMMARY OF THE INVENTION

The present invention, among other applications, is directed to solving the above-noted problems and addresses other problems, disadvantages, and limitations of the prior art by providing a superior technique for managing payments for goods and services in a retail establishment. In one embodiment, a method for handoff of a transaction for completion is provided, the method including: via a server, employing a token with a point-of-sale terminal to perform the handoff of the transaction for completion on a guest device, where the server is not collocated with the point-of-sale terminal, and where communications between the point-of-sale terminal and the server are transmitted and received through a gateway device that is collocated with the point-of-sale terminal; and via the server, transmitting details of the transaction for display on the guest device, receiving transaction completion data provided by the guest device, and notifying the guest device and the point-of-sale terminal that the transaction is complete.

One aspect of the present invention contemplates a computer-readable storage medium storing program instructions that, when executed by a computer, cause the computer to perform a method for handoff of a transaction for completion, the method including: via a server, employing a token with a point-of-sale terminal to perform the handoff of the transaction for completion on a guest device, where the server is not collocated with the point-of-sale terminal, and where communications between the point-of-sale terminal and the server are transmitted and received through a gateway device that is collocated with the point-of-sale terminal; and via the server, transmitting details of the transaction for display on the guest device, receiving transaction completion data provided by the guest device, and notifying the guest device and the point-of-sale terminal that the transaction is complete.

Another aspect of the present invention envisages a system for handoff of a transaction for completion, the system having a point-of-sale terminal and a server. The point-of-sale terminal is configured to employ a token with the server to perform the handoff of the transaction for completion on a guest device, where communications between the point-of-sale terminal and the server are transmitted and received through a gateway device that is collocated with the point-of-sale terminal. The server is configured to transmit details of the transaction for display on the guest device, and is configured to receive transaction completion data provided by the guest device, and is configured to notify the guest device and the point-of-sale terminal that the transaction is complete, where the server is not collocated with the point-of-sale terminal.

BRIEF DESCRIPTION OF THE DRAWINGS

These and other objects, features, and advantages of the present invention will become better understood with regard to the following description and accompanying drawings where.

DETAILED DESCRIPTION

Figure 1:
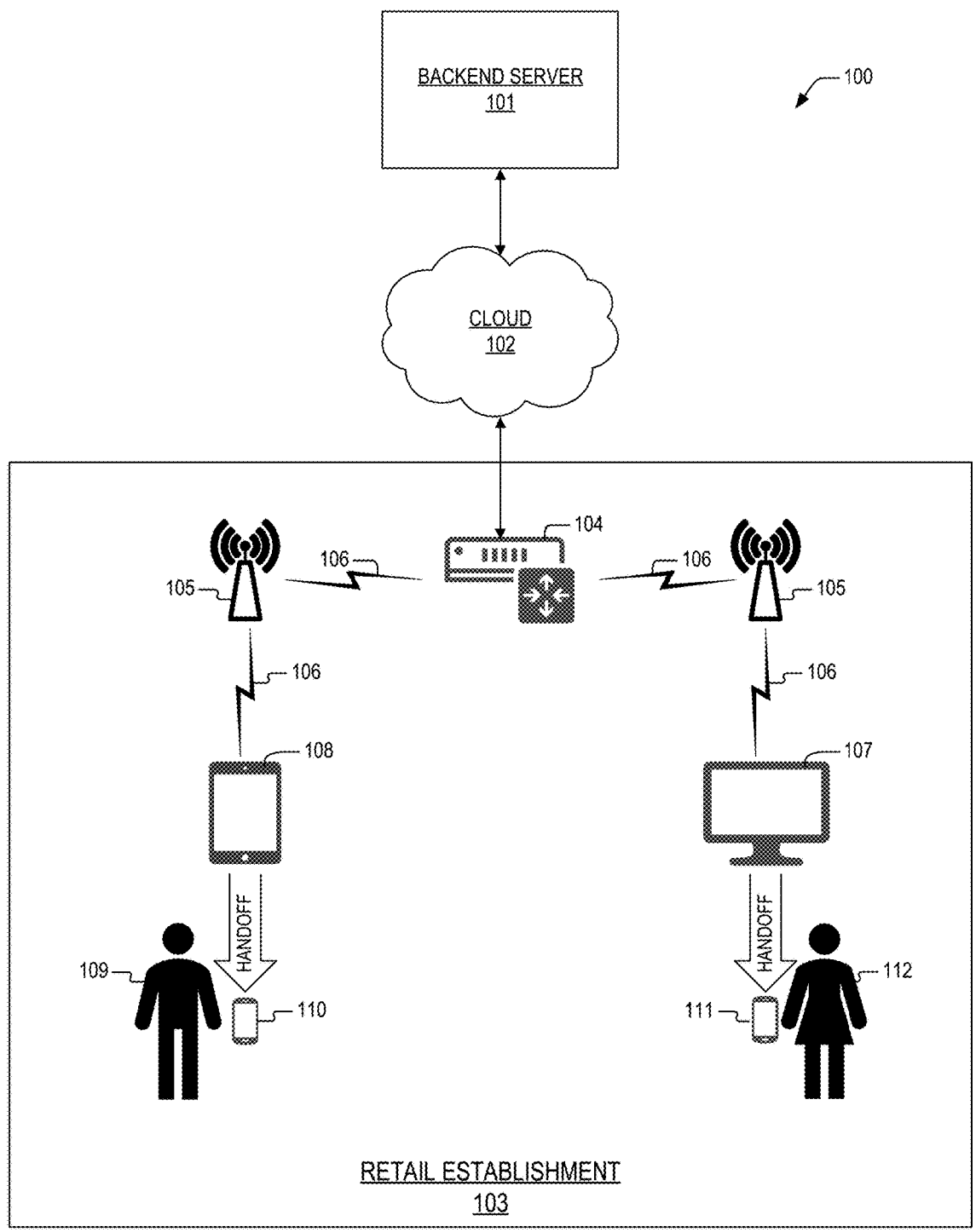
FIG. 1 is a block diagram illustrating a transaction handoff and processing system according to the present invention.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application," "application," "application program," "app," "computer code," "code process," or "program") by performing operations on data that may include arithmetic operations, logical operations, and input/output operations. A CPU may also be referred to as a processor In view of the above background discussion on how transactions are currently processed by electronic point of sale terminals within a retail establishment, a discussion of the present invention will be provided with reference to FIGS. 1-9. The present invention overcomes the problems associated with present-day techniques by providing methods and apparatus whereby retail establishment staff may perform a handoff of a current transaction from a point-of-sale (POS) terminal to a guest device to allow for concurrent display of the transaction on both the POS terminal and the guest device, and to allow a guest to provide a tip amount, an optional payment method, and service feedback that alerts management to problems, thus providing significant improvements in this field of technology.

Referring to FIG. 1, a block diagram is presented illustrating a transaction handoff and processing system 100 according to the present invention. The system 100 has a backend server 101 that is coupled to an internet gateway 104 that is disposed within a retail establishment 103. The backend server 101 is not disposed within the establishment 103 and may be disposed within a network operations center or other location. The backend server 101 is coupled to the gateway 104 via the internet cloud 102 using a combination of conventional wired and wireless links that allow for communications between devices over the internet cloud 102. The conventional wired links may include, but are not limited to, Ethernet, cable, fiber optic, and digital subscriber line (DSL). As part of the network path to and through the cloud 102, providers of internet connectivity (e.g., ISPs) may employ wireless technologies from point to point as well.

The gateway 104 provides for coupling of the server 101 to one or more point-of-sale (POS) terminals 107-108 via one or more access points 105. The access points 105 may be coupled to the gateway 106 via wired or wireless links 106. The wired links 106 may include, but are not limited to, Ethernet networks, local area networks, and etc. The wireless links 106 may comprise, but are not limited to, Wi-Fi, Bluetooth, near field communications, infrared links, IEEE 802.15.4, Zigbee radio links, and cellular based links (e.g., 3G, 4G, LTE, 5G), or a combination of the noted links. The POS terminals 107-108 may be configured differently to comport with intended function (i.e., seating, order entry, order fulfillment, payment processing, owner engagement, order feedback, etc.), or they may be configured similarly.

To clearly teach the present invention, two types of POS terminals are depicted as part of the system: a fixed POS terminal 107 and a mobile POS terminal 108. The fixed terminal 107 is deemed as such because it generally is employed in a fixed location, such as to allow a guest 112 to place, pay for, and pick up orders. Though the fixed POS terminal 107 is shown in the FIGURE as being coupled wirelessly to the gateway 104 via an access point 105, because it is employed in a fixed location it may alternatively be coupled to the gateway 104 via a wired link. The mobile POS terminal 108 may be employed by wait staff in multiple locations within the establishment 103 to provide services to a guest 109 enabling the guest 109 to place, pay for, and pick up orders. Though the general functions of the two POS terminals 107-108 are substantially similar, the primary difference between their mode of use is that typically a guest 112 with move to the fixed POS terminal 107 to place, pay for, and pick up orders, where the fixed POS terminal 107 may be attended by staff or may function as a self-serve stand-alone kiosk. In contrast, wait staff may be in possession of the mobile POS terminal 108 and may approach a guest 109 who may be seated at a table, and where the wait staff may employ the mobile POS terminal 108 to place an order on behalf of the guest. The wait staff may further deliver ordered items to the guest and accept payment from the guest for the ordered items.

Both of the guests 109, 112 are in possession of respective smart devices 110, 111 such as, but not limited to, Android phones, iPhones, Android tablets, iPads, and equivalent devices. The smart devices 110, 111 may be executing a proprietary application program that corresponds to the retail establishment and that allows the guests 109, 112 to perform of one or more functions associated with processing of their orders by handing off those functions from the POS terminals 107-108 to their respective smart devices 111, 110.

As will be described in further detail below, one embodiment of the present invention contemplates that a handoff from a POS terminal 107, 108 to a smart device 111, 110 is initiated when the guest 112, 109 presents a payment instrument (i.e., credit card) and the instrument is entered into system 100 via a conventional credit card reader (swipe, scan, or tap) that is part of the terminal 107, 108. Another embodiment of the present invention comprehends that a handoff from a POS terminal 107, 108 to a smart device 111, 110 is initiated when the guest 112, 109 accepts a transaction token that is provided by or directly on the POS terminal 107, 108. Once a handoff to the smart device 111, 110 is performed, the remainder of the transaction is conducted by communications between the backend server 101, the smart device 111, 110, and the POS terminal 107, 108. In one embodiment, the remainder of the transaction may include synchronous display on the smart device 111, 110 of what is being displayed on the POS terminal 107, 108 (so called, "guest facing display) and entry of tip amount, alternative payment instruments, and order feedback/comments via the smart device 111, 110. In a further embodiment, the system 100 may be configured to provide alerts and action options to management of the establishment 103 when a tip falls below a configured threshold percentage and/or when negative feedback is provided via the smart device 111, 110.

Advantageously, the system 100 according to the present invention provides technological improvements to this field of the art by enabling establishments 103 to provide "guest facing displays" that are mandated by state law without requiring establishment owners to purchase additional register displays. In addition, the system 100 provides a mechanism whereby a guest 112, 109 may provide a tip amount, alternate payment instrument, and feedback on service more privately than has otherwise been heretofore provided. For some guests 112, 109 that may be disinclined to handle publicly available terminals 107, 108, the system 100 according to the present invention provides for completion and payment for their orders through use of their own personal smart device 111, 110. Moreover, notable processing speed improvements to this field of technology are provided for by the present invention because wait staff may attend to other functions rather than waiting for a guest 112, 109 to enter data on their respective POS terminals 107, 108.

Figure 2:
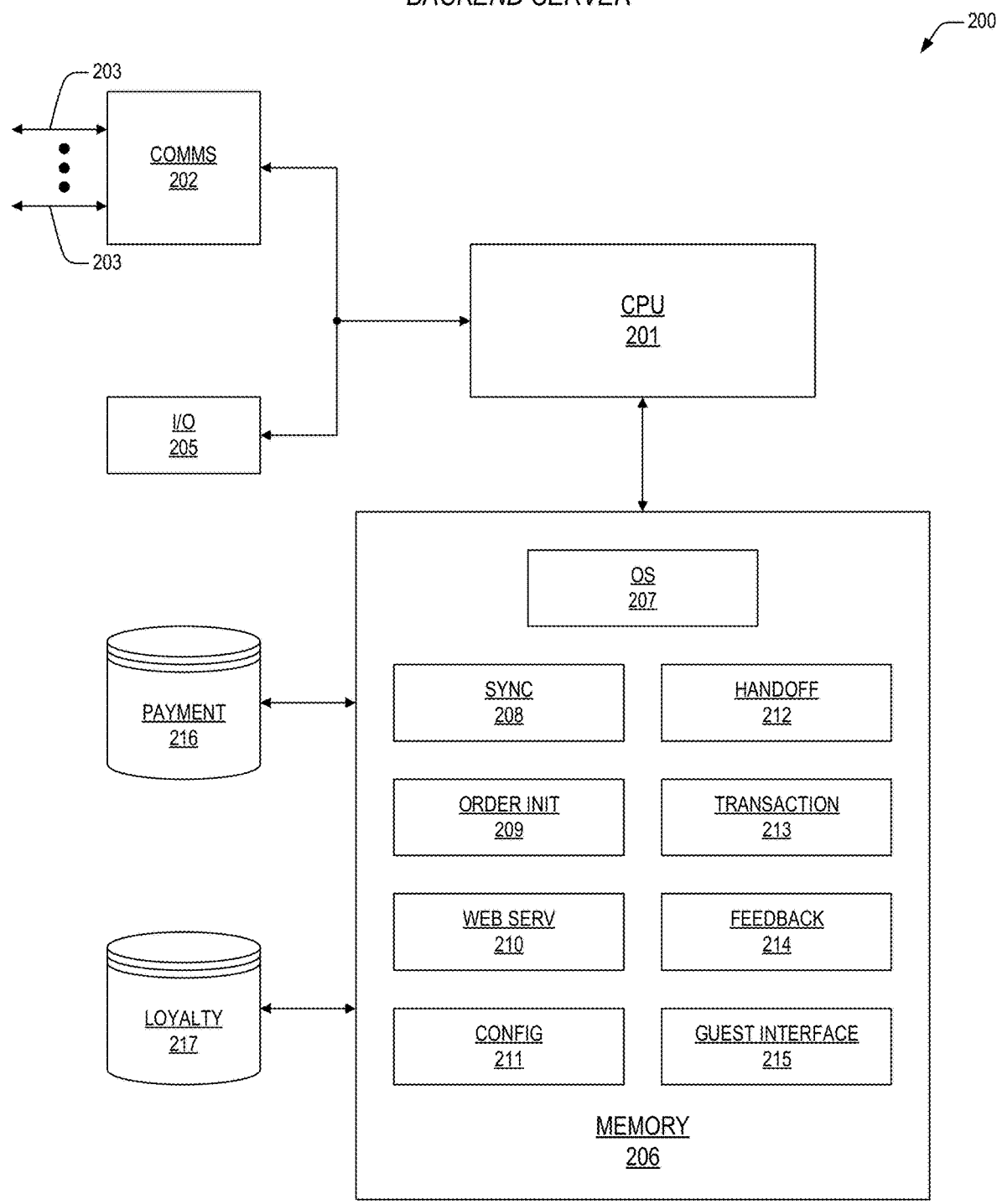
FIG. 2 is a block diagram depicting a backend server according to the present invention.

Turning now to FIG. 2, a block diagram is presented depicting a backend server 200 according to the present invention, such as the backend server 101 of FIG. 1. The backend server 200 may be embodied as a central processing unit (CPU) 201 that is coupled to a memory 206 having both transitory and non-transitory memory components therein. The CPU 201 is also coupled to a communications circuit 202 that coupled the backend server 200 to the internet cloud via one or more wired and/or wireless links 203 as are discussed above. The backend server 200 may also comprise input/output circuits 205 that include, but are not limited to, data entry and display devices (e.g., keyboards, monitors, touchpads, etc.). The memory 206 may be coupled to a payment token database 216 and to a loyalty token database 217. In one embodiment, the payment token database 216 and loyalty token database 217 are disposed in the same location as the memory 206. In another embodiment, the payment token database 216 and loyalty token database 217 are not disposed in the same location as the memory 206 and are accessed via messages transmitted and received over the links 203 rather than by direct connection as shown in the diagram.

The memory 206 may include an operating system 207 such as, but not limited to, Microsoft Windows, Mac OS, Unix, and Linux, where the operating system 207 is configured to manage execution by the CPU 201 of program instructions that are part of components of one or more application programs. In one embodiment, a single application program comprises a plurality of code segments 208-215 resident in the memory 206 and identified as a synchronization process (SYNC) 208, an order initiation process (ORDER INIT) 209, a web services process (WEB SERV) 210, a configuration process (CONFIG) 211, a handoff process (HANDOFF) 212, a transaction process (TRANSACTION) 213, a feedback process (FEEDBACK) 214, and a guest interface process (GUEST INTERFACE) 215.

Operationally, the backend server 200 may execute one or more of the code segments 208-215 as required to enable POS terminals in a retail establishment to initiate orders on behalf of guests, to synchronize an order taken by one POS terminal with other POS terminals in the establishment, to route orders for processing and fulfillment, to process payments, to perform handoff of a transaction to a guest device, to simultaneously transmit POS display data to the guest device, to receive data provided by the guest device for transaction completion and feedback, and to transmit negative feedback and actions to designated POS terminals in the establishment for prompt management attention.

The payment token database 216 comprises a plurality of payment records that each link a payment token to a particular smart device, where the smart device has been employed via a proprietary application executing thereon to register guest information and a payment instrument with the establishment. The guest information may comprise a credit card number and guest name. Once registered, the guest information is encoded into a payment record comprising a unique and secure payment token and an identifier for the linked smart device. Accordingly, when a guest at the establishment provides a payment instrument that comprises the credit card number and guest name, a corresponding payment token is retrieved from the payment token database 216 along with an identifier for a corresponding smart device. In one embodiment, a single payment token may be linked to more than one smart device, e.g., a smart phone and smart tablet. In one embodiment, when a guest employs the proprietary application to register, push notifications may also be enabled as part of the registration process, thus enabling the backend server 200 to send push notifications to a linked smart device.

The loyalty token database 217 comprises a plurality of loyalty records that each link a loyalty account identifier to one or more fields of contact information for a guest who has created a loyalty account with the establishment either via a web browser coupled to the backend server 200 or directly from the proprietary application executing on their smart device. The loyalty records may include a payment token along with one or more of the following fields: smart device identification, guest name, guest email address, guest number for text messages, and other identifiers for direct messaging (e.g., Facebook Messenger). In one embodiment, during registration a guest may opt to allow push notifications to their smart device from the backend server 200.

Accordingly, when a guest at the establishment employs the proprietary application on their smart device to accept a transaction token provided by a POS terminal, the loyalty token is retrieved from the loyalty token database 217 along with an identifier for the smart device, thus enabling push notifications to be transmitted to the smart device that may include simultaneous display of transaction information on both the POS terminal and the smart device, options for tip and payment instrument, and feedback on service. For guests that have not enabled push notifications, no unique device identifier is registered in the loyalty database 217; however, one or more of the other contact fields (e.g., email, text message number, etc.) may be employed by the backend server 200 to transmit a browser link to the guest via a corresponding transmission medium (e.g., email, SMS message, Facebook message, etc.). Upon selection of the browser link on a smart device, the smart device's browser is redirected to a web page generated by the guest interface component 215 within the backend server that enables the guest to perform the same functions as discussed above to monitor and complete the transaction, yet from within a browser environment rather than the proprietary application. Further details of each of the code segments 208-215 will be discussed below.

Figure 3:
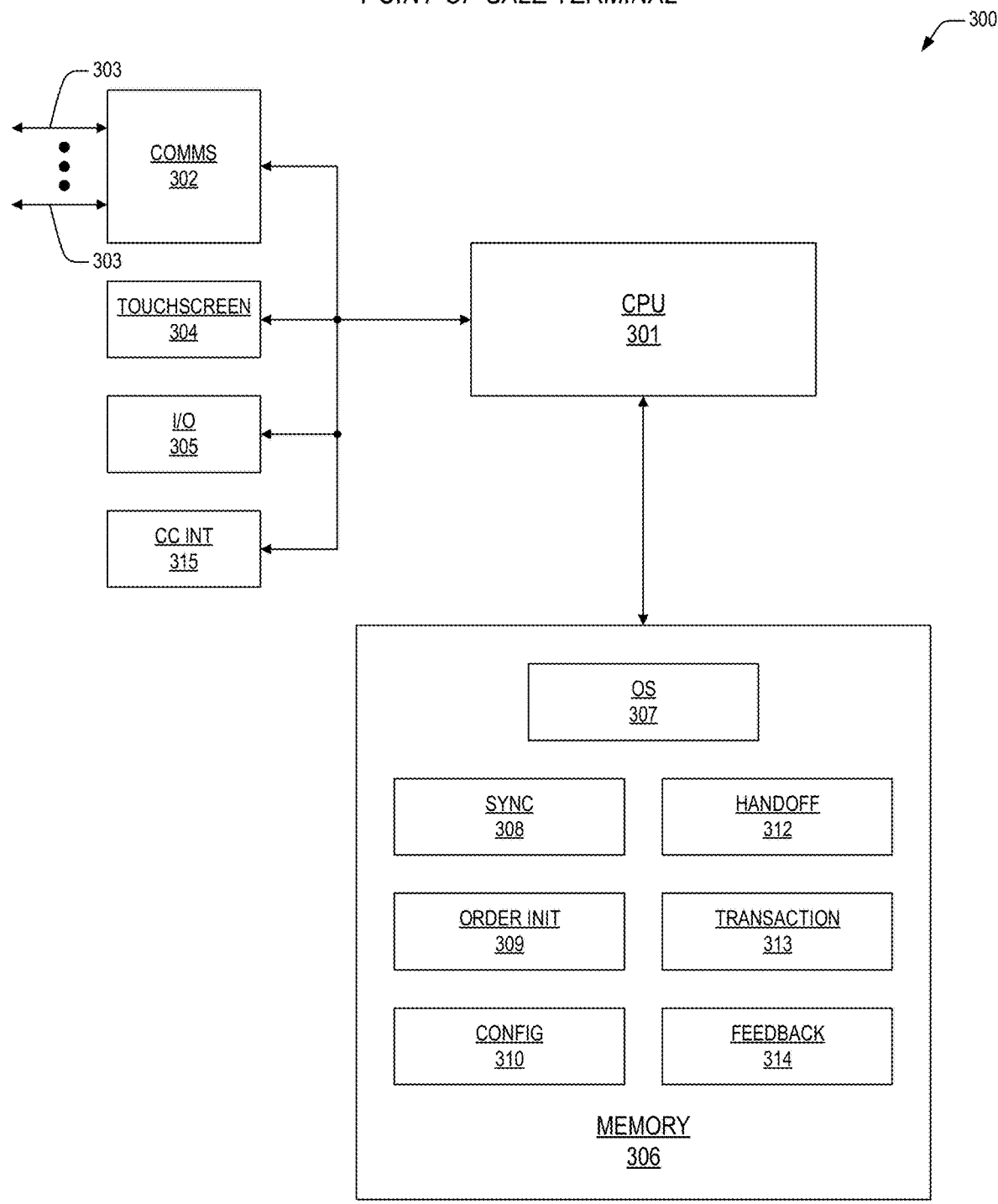
FIG. 3 is a block diagram featuring a point-of-sale terminal according to the present invention.

Now referring to FIG. 3, a block diagram is presented featuring a point-of-sale terminal 300 according to the present invention. The terminal 300 may be embodied as either a fixed terminal 107 or a mobile terminal 108 as is discussed above with reference to FIG. 1, the differences being generally size of the terminal 300 and connection (wired or wireless) to the gateway 104. Generally, a fixed terminal 107 is larger in size than a mobile terminal 108 and the mobile terminal 108 is sized so that it can be easily carried by wait staff.

The terminal 300 may be embodied as a central processing unit (CPU) 301 that is coupled to a memory 306 having both transitory and non-transitory memory components therein. The CPU 301 is also coupled to a communications circuit 302 that couples the terminal 300 to a gateway 104 within the establishment via one or more wired and/or wireless links 303 as are discussed above. Through these links 303, the terminal 300 along with other terminals in the establishment may directly communicated with the backend server 200. No on-premise local server is required to perform any point-of-sale function within the establishment as all synchronization functions are performed through messages exchanged between the backend server 200 and the terminal 300. The terminal 300 may comprise a touchscreen 304 that allows for order entry, display of menu items, and related functions. The terminal 300 may also comprise input/output circuits 205 that include, but are not limited to, data entry and display devices (e.g., keyboards, monitors, touchpads, scanners, printers, etc.). The terminal 300 may further comprise a credit card entry interface 315 that staff may employ to enter credit card payment data into the system. In one embodiment, the interface 315 comprises a conventional credit card reader that may provide for entry of credit card data via magnetic strip swipe, EMV chip reading ("dip"), or reading of encoded data via near field communications ("tap"). The interface 315 may be capable of one or more of the aforementioned mechanisms for reading credit card data. In one embodiment, the credit card interface 315 may be integrated into the same housing as the touchscreen 304.

The memory 306 may include an operating system 307 such as, but not limited to, Microsoft Windows, Mac OS, Unix, and Linux, where the operating system 307 is configured to manage execution by the CPU 301 of program instructions that are part of components of one or more application programs. In one embodiment, a single application program comprises a plurality of code segments 308-310, 312-314 resident in the memory 306 and identified as a synchronization process (SYNC) 308, an order initiation process (ORDER INIT) 309, a configuration process (CONFIG) 310, a handoff process (HANDOFF) 312, a transaction process (TRANSACTION) 313, and a feedback process (FEEDBACK) 314. Other code segments (not shown) may be provided to perform other point-of-sale functions by the terminal 300 (e.g., printing of receipts, entry of gift cards, etc.) which are not discussed herein in order to clearly teach aspects of the present invention.

Operationally, the terminal 300 may execute one or more of the code segments 208-215 as required to enable guests or wait staff in a retail establishment to initiate orders; to communicate orders to the backend server; to receive communications from the backend server that synchronize an order taken by one POS terminal 300 with other POS terminals 300 in the establishment; to obtain payment instruments; to communicate payment data to the backend server for authorization; to provide for entry of tip amounts and order feedback from guests; to display or print a transaction token for presentation to a guest; upon acceptance of the transaction token by a device corresponding to the guest, to coordinate handoff of a corresponding transaction to a guest device with the backend server; and to receive communications from the backend server indicating completion of the transaction.

The configuration process 310 may be employed upon power up of the terminal 300 to configure the terminal 300 for a specific function such as a seating terminal, a self-serve kiosk, an order processing/fulfillment terminal, an expediter terminal, or a management feedback and action terminal.

Operationally, the order initiation process 309 may execute to allow for display and entry of a guest order. As the order is entered, it is transmitted to the backend server via messages over the links 303. The synchronization process 308 is executed to and works in conjunction with the synchronization process 208 in the back end server maintain persistent and durable states of all orders within the establishment, even though those orders may have been entered on other terminals 300. Advantageously, this allows any terminal 300 within the establishment to modify and close out an existing order. In addition, this synchronization enables multiple terminals 300 to be employed to process a single order, say for a table of 20 guests, thus significantly improving the time required to enter and fulfill orders.

To close out an order, the transaction process 313 may be executed to provide for display of order details and subtotals, and to provide for direct entry of payment by a guest. If payment is by credit card, the card data may be entered via the credit card interface and transmitted via the links 303 to the transaction process 213 within the backend server 200. The backend server 200 may then access the payment token database 216 to obtain a payment token and linked smart device identifier corresponding to the entered credit card data. If enabled, the backend server 200 then transmits a push notification to the smart device(s) associated with the smart device identifier that notifies the guest that the transaction can be completed on their smart device. If accepted, then the backend server executes that handoff process 212 which notifies the handoff process 312 in the terminal 300 that the transaction is being completed via the guest's smart device and also executes the guest interface process 215 to format and transmit content to the guest device that shows details necessary to complete the transaction (e.g., ordered items, subtotal, tax, tip entry field, signature field, etc.). At this point, the terminal 300 is essentially free to be used for other purposes because communications to complete the transaction are now between the guest's smart device and the backend server 200. The guest interface process 215 may also be employed to receive data entered by the guest such as tip amount, signature, and feedback on the order. All of the data displayed and entered on the guest's smart device occurs while running the proprietary application program linked to the establishment. Therein, in one embodiment, the guest may change payment instruments to any instrument (e.g., gift card, PayPal, Apple Wallet) that may be registered with the system. In one embodiment, the system may treat a registered loyalty card in exactly the same manner as a credit card for purposes of handoff and selection of payment instrument within the proprietary application program.

In the above embodiments, presentation of a registered credit card or loyalty card is what initiates a handoff from the terminal 300 to a corresponding guest smart device. However, the present invention contemplates other mechanisms for initiating a handoff. In one embodiment, the handoff process 312 may execute to generate a transaction token that is directly displayed on the touchscreen 304 or that may be printed out, where the guest may employ their smart device to accept the token and upon acceptance of the token, handoff is perfected by launching the proprietary application on the guest's smart device and performing the functions described above to complete the transaction. In another embodiment, the handoff process 312 may also execute to generate a transaction token that is directly displayed on the touchscreen 304 or that may be printed out, where the guest may employ their smart device to accept the token and upon acceptance of the token, handoff is perfected by launching a browser window on the guest's smart device and performing the functions described above to complete the transaction. Control of content of the browser window is performed by execution of the web services process 210 within the backend server. This browser-based handoff embodiment is utilized when a guest does not have the proprietary application installed on their smart device.

In a further embodiment, a guest may have the proprietary application installed on their smart device but may have not enabled push notifications. However, if a suitable form of contact information is linked within the loyalty database 217, the backend server 200 may employ an alternative communication method to send a link to other applications executing on the guest's smart device such as, but not limited to, email, SMS messaging, and Facebook Messenger. When the guest accepts the link, the proprietary application is launched, and transaction handoff is performed as discussed above. If the proprietary application is not installed on the guest device, when the guest accepts the link, a browser-based handoff is performed for completion of the transaction.

In a preferred embodiment, the handoff process 212 in the backend server executes to send a transaction token to the terminal 300. The handoff process 312 in the terminal 300 executes to display the transaction token directly or to print the token on paper or it may be displayed as a sticker/poster adjacent to the terminal 300 for acceptance by the guest's smart device. In one embodiment, the transaction token comprises a QR code that may be read by a conventional QR code reader executing on the guest's smart device. Another embodiment contemplates a bar code that is read by a conventional bar code reader on the guest's smart device. In one embodiment, the transaction token is unique to the transaction. In another embodiment, the transaction token is static (i.e., the same for all transactions) and the system 200 is configured to associate that transaction token with a current transaction being processed when the transaction token is accepted by the guest's smart device.

Figure 4:
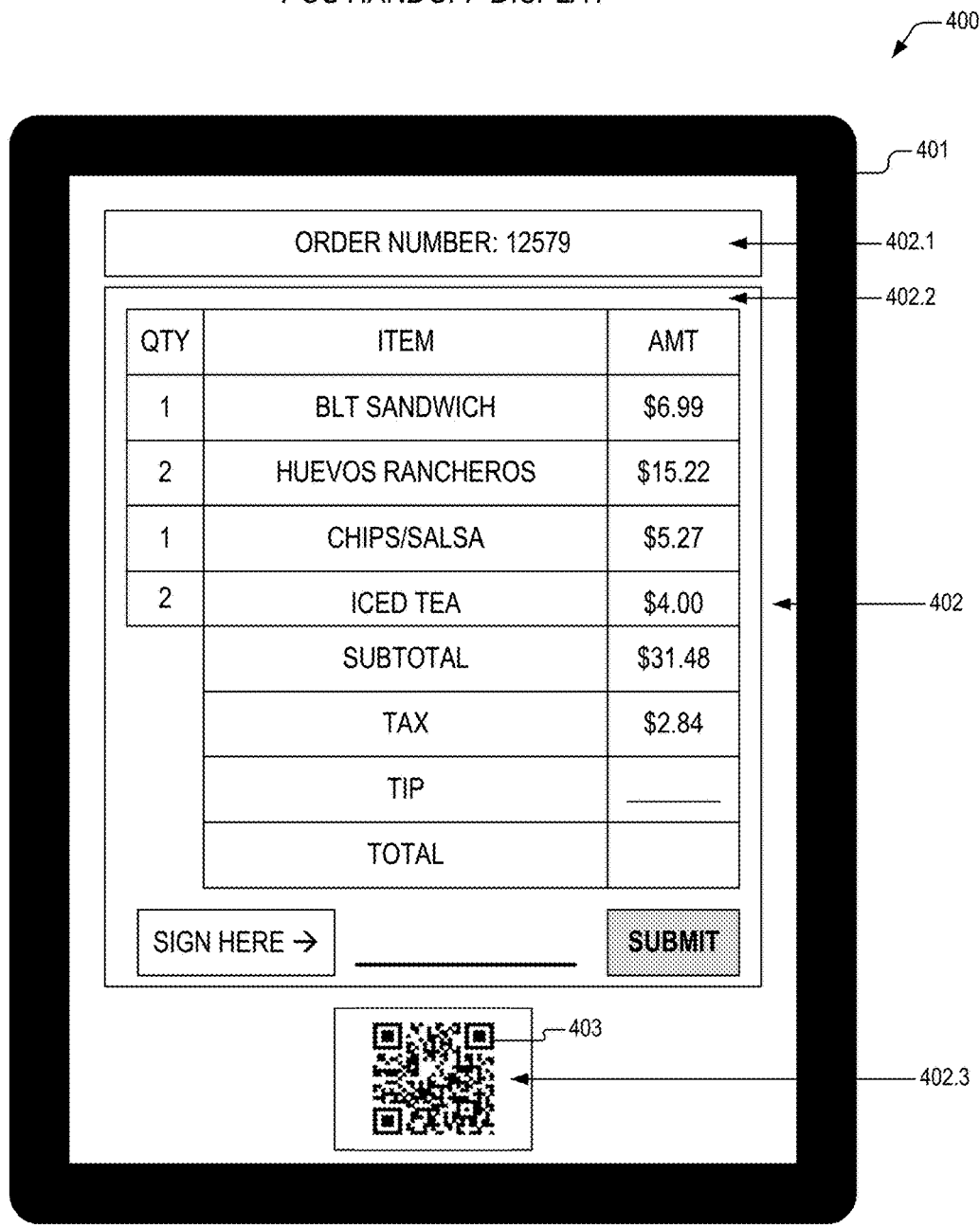
FIG. 4 is a diagram showing an exemplary handoff display on a point-of-sale terminal.

Now turning to FIG. 4, a diagram is presented showing an exemplary handoff display on a point-of-sale terminal 400. The terminal 400 may comprise a housing 401 and touchscreen display 402 such as an iPad or Android tablet. The display 402 may comprise an order number area 402.1 that displays an identifier ("12579") for a transaction. The display 402 may additionally comprise a transaction details area 402.2 that displays items corresponding to the transaction identifier, quantity ordered, price of the items, along with a subtotal amount and entry areas for tip and guest authorization signature. Upon entry of a tip amount by a guest or wait staff, the terminal 400 may calculate the total.

The display 402 also has a transaction token display area 402.3 that shows a transaction token 403 corresponding to the transaction identifier for presentation to the guest. Upon acceptance of the token by the guest's smart device, or via credit card or loyalty card swipe as discussed above, the terminal 400 notifies the backend server 200 that handoff is accepted, and the backend server 200 then operates to transmit a version of the transaction details area 402.2 to the guest's smart device that is formatted for display thereon, either within the proprietary application executing on the guest's smart device or within a web browser on the guest's device. As noted above, handoff of the transaction to the guest's smart device may be prompted by reading a credit card or loyalty card or by acceptance of the transaction token 403.

The present invention also comprehends handoff of other items for display and data entry on the guest's smart device such as, but not limited to, feedback scoring and comments on the order by the guest. In one embodiment, feedback scoring may be simply a "thumbs up" or "thumbs down" selection by the guest. In another embodiment, a star rating scale may be presented.

Figure 5:
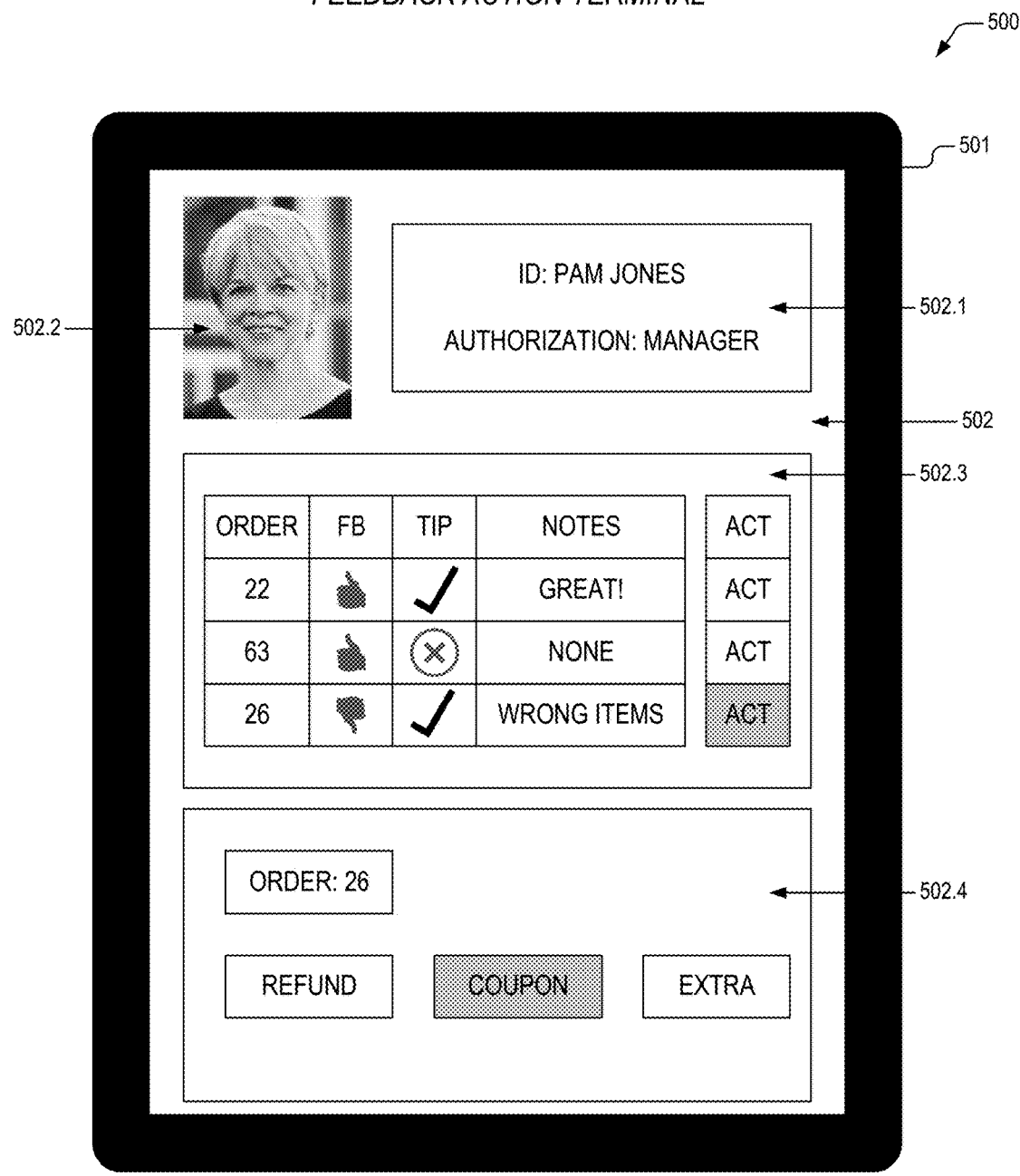
FIG. 5 is a diagram illustrating an exemplary feedback action display on a point-of-sale terminal according to the present invention that is configured for management access.

Referring now to FIG. 5, a diagram is presented illustrating an exemplary feedback action display on a point-of-sale terminal 500 according to the present invention that is configured for management access. As discussed above, the configuration process 310 in the terminal 300 may execute in conjunction with the configuration process 211 in the backend server 200 in the terminal upon power up of the terminal 300 to configure it for use as a management feedback and action terminal. Accordingly, the terminal 500 may comprise a housing 501 and touchscreen display 502 such as an iPad or Android tablet. The display 502 may comprise an identification and authorization display area 502.1 along with a photo area 502.2 that identifies a staff person that is authorized to receive guest feedback and take alleviation actions to increase customer satisfaction and loyalty. Accordingly, the display 502 may additionally comprise a guest feedback summary area 502.3 that shows guest feedback for current orders in the establishment. The feedback area 502.3 shows scoring (thumbs up/down), tip threshold indication, and entered guest notes along with a management action control ACT. As noted above, the feedback process 214 in the backend server 200 may determine that a tip amount provided on a transaction falls below a prescribed percentage threshold, for example, a tip of less than ten percent. Note that orders 22 and 26 received a tip entry that exceeds the percentage threshold, but the tip amount entered for order 63 is less than the prescribed threshold. Though the tip amount for order 26 is satisfactory, note that the guest entered a thumbs down score and further noted that the wrong items were delivered. Upon actuating and ACT control for order 26, management options are shown in a management options area 502.4. In addition to visiting the unsatisfied guests, if they are still in the establishment, the manager has opted to provide a discount coupon for deliver to the guest. This coupon may be pushed to the guest's smart device via push notification, email, SMS message, or may be directly placed in the proprietary application executing on the guest's smart device.

As alluded to above, guests are often reluctant to provide candid feedback in the form of comments, scores, or tip amounts when a staff person is watching and waiting. Advantageously, because transaction completion is handed off to guest devices according to the present invention, not only is a mechanism provided for more truthful and detailed feedback, but the feedback process 214 in the backend server allows for instantaneous alert of management via communications through the internet cloud.

Figure 6:
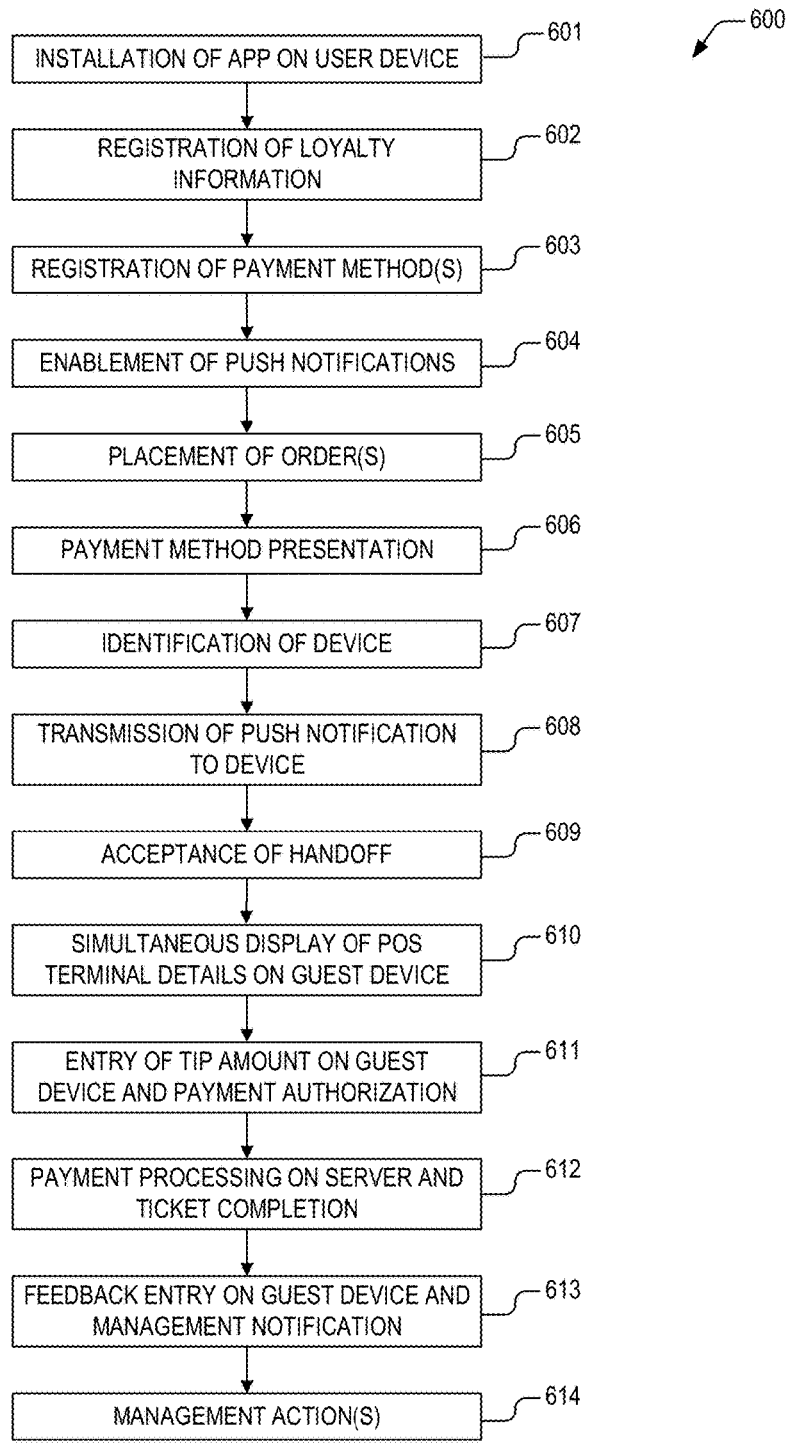
FIG. 6 is a flow diagram detailing a method for handoff of a transaction from a point-of-sale terminal to a guest device, where the handoff is triggered upon entry of credit card payment data.

Referring now to FIG. 6, a flow diagram 600 is presented detailing a method for handoff of a transaction from a point-of-sale terminal to a guest device, where the handoff is triggered upon entry of credit card payment data. Flow begins at block 601 when a guest downloads and installs a proprietary application corresponding to a retail establishment on a smart device that belongs to the guest. Flow then proceeds to block 602.

At block 602, the guest executes that proprietary application on the smart device and the application prompts the guest to enter registration information such as, but not limited to, name, email address, phone number for text messaging, and other forms of contact information (e.g., Facebook Messenger address). The registration information is then transmitted by the proprietary application through the cloud to the backend server 200, which creates a loyalty token for the guest and stores a corresponding loyalty record in the loyalty database 217. Flow then proceeds to block 603.

At block 603, the guest is prompted by the proprietary application to enter one or more methods of payment such as a credit card number or gift card number(s). The one or more methods of payment are then transmitted by the proprietary application through the cloud to the backend server 200, which creates an encoded payment token for the guest and stores the payment token in the previously created corresponding loyalty record in the loyalty database 217. Flow then proceeds to block 604.

At block 604, the guest is prompted by the proprietary application to enable push notifications to the guest's smart device. Acceptance of enablement is transmitted by the proprietary application through the cloud to the backend server 200, which creates a payment token record in the payment database 216 that includes the previously encoded payment token for the guest along with the unique device identifier for pushing notifications to the guest's smart device. Flow then proceeds to block 605.

At block 605, the guest may place an order for goods either through the proprietary application, via a web page maintained by the web services component 210, within the retail establishment on a self-service kiosk 300, via a third-party application (e.g., Door Dash or Grubhub) that is coupled to the backend server 200, or wait staff at the establishment may enter the order directly via the touchscreen 304 into a fixed or mobile point-of-sale terminal 300. If entered on a terminal 300, the order initiation component 309 creates an order number and communicates details of the order to the backend server 200. The synchronization component 208 then transmits the order number and details of the order to remaining terminals 300 in the establishment. If entered through the proprietary application or a third-party application, then the order initiation component 209 in the backend server creates an order number along with details of the order and then transmits the order number and details of the order to terminals 300 in the establishment. Flow then proceeds to block 606.

At block 606, following fulfillment of the placed order, the guest presents a payment instrument that is read by a terminal within the establishment. Encoded information from the payment instrument is then transmitted by the transaction component 313 in the terminal 300 to the transaction component 213 in the backend server. Flow then proceeds to block 607.

At block 607, the handoff component 212 in the server 200 employs the encoded payment information to accesses a corresponding record in the payment token database 216 that designates a corresponding push notification device identifier. Flow then proceeds to block 608.

At block 608, the handoff component 212 then employs the identifier to send content to the guest's smart device requesting handoff of the transaction to the guest device. Flow then proceeds to block 609.

At block 609, the guest accepts handoff by selecting the push notification, which wakes up the proprietary application for execution on the guest device. The proprietary application then notifies the handoff component 212 that handoff has been accepted. Flow then proceeds to block 610.

At block 610, the handoff component 212 passes control to the guest interface component 215 that transmits content of the transaction, exemplified in the diagram of FIG. 4, that is formatted for display on the guest device within the proprietary application. Thus, the terminal 300 may subsequently be employed to process other orders. Flow then proceeds to block 611.

At block 611, the guest enters a tip amount and payment authorization (e.g., signature and submission), which is communicated by the proprietary application to the backend server 200. Flow then proceeds to block 612.

At block 612, the transaction component 213 processes the payment using the provided payment instrument and messages terminals 300 in the establishment and the proprietary application that payment of the ticket is complete. The transaction component 213 may also transmit an electronic receipt to the proprietary application as a record of the transaction. The receipt may optionally be stored within the proprietary application for reference. The proprietary application may further provide for export of the receipt. The receipt may optionally be stored within the proprietary application for reference. The proprietary application may further provide for export of the receipt. Flow then proceeds to block 613.

At block 613, the guest interface component 215 then generates and transmits content to the guest device that allows the guest to provide feedback on the order, as is discussed above. The feedback is then transmitted by the proprietary application to the feedback component 214 of the backend server 200, which determines according to programmed criteria if management attention to the order is warranted. The feedback component 214 additionally may access the tip amount entered by the guest and determine if a tip percentage is above or below a threshold that is programmed into the system by management. The feedback, indication of acceptable tip percentage, and any notes provided by the guest are then transmitted by the feedback component 214 to a feedback component 314 in a terminal 300 in the establishment that is configured for management access as described above. Accordingly, a management representative is immediately alerted to guest dissatisfaction and is provided with options similar to those described with reference to FIG. 5 that may assuage the guest and secure continuing loyalty. Flow then proceeds to block 614.

At block 614, the management representative selects one of the displayed actions or may take another action to address service concerns that were identified by the guest in block 613.

Figure 7:
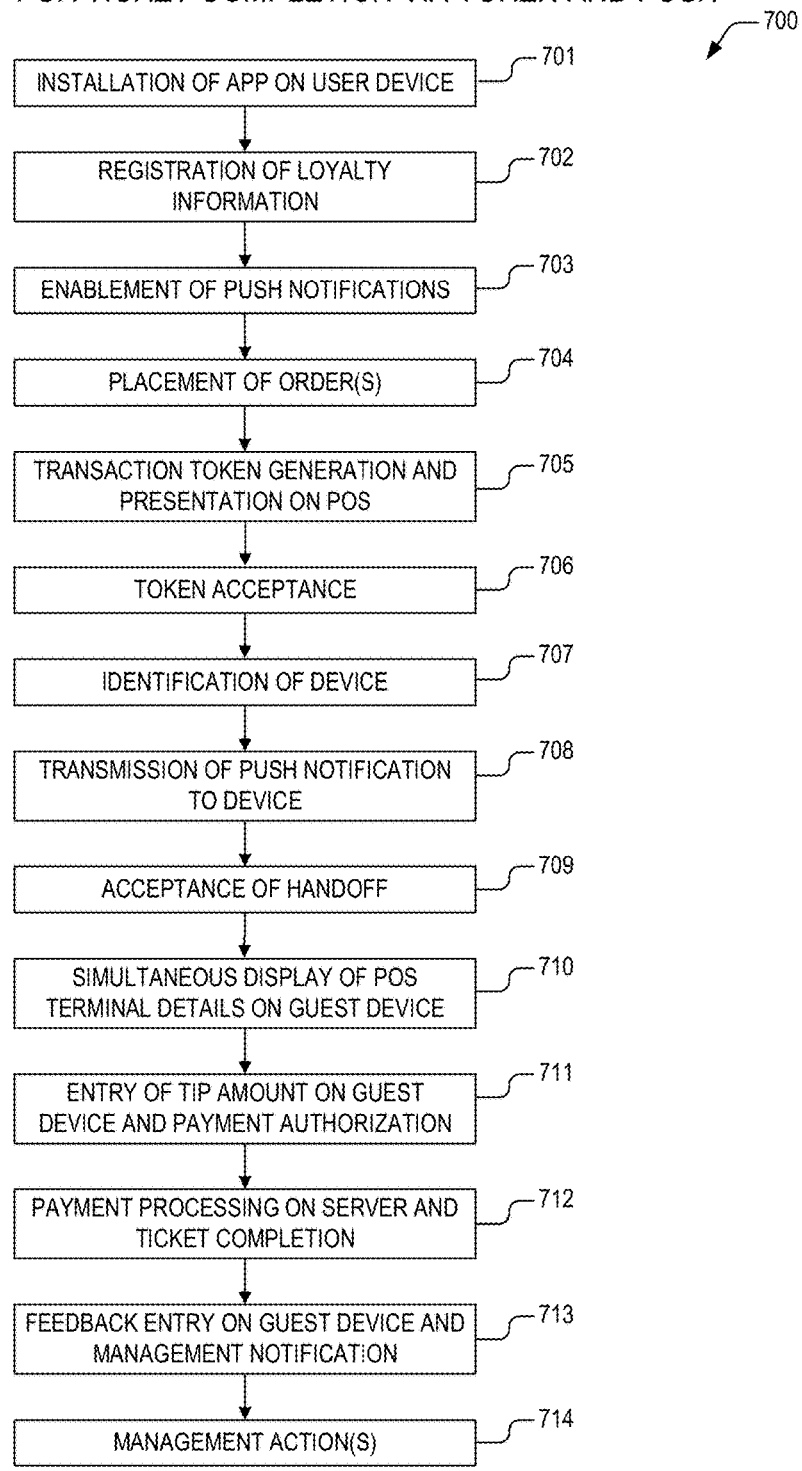
FIG. 7 is a flow diagram detailing a method for handoff of a transaction from a point-of-sale terminal to a guest device, where the handoff is triggered upon acceptance of a payment token by the guest device.

Referring now to FIG. 7, a flow diagram 700 is presented detailing a method for handoff of a transaction from a point-of-sale terminal to a guest device, where the handoff is triggered upon acceptance of a transaction token. This method is employed for handoff when a guest has installed the proprietary application on their smart device and has enabled push notifications but has not registered a payment instrument. Flow begins at block 701 when a guest downloads and installs a proprietary application corresponding to a retail establishment on a smart device that belongs to the guest. Flow then proceeds to block 702.

At block 702, the guest executes that proprietary application on the smart device and the application prompts the guest to enter registration information such as, but not limited to, name, email address, phone number for text messaging, and other forms of contact information (e.g., Facebook Messenger address). The registration information is then transmitted by the proprietary application through the cloud to the backend server 200, which creates a loyalty token for the guest and stores a corresponding loyalty record in the loyalty database 217. Flow then proceeds to block 703.

At block 703, the guest is prompted by the proprietary application to enable push notifications to the guest's smart device. Acceptance of enablement is transmitted by the proprietary application through the cloud to the backend server 200, which stores a unique identifier for the guest device in the previously created loyalty record, which will be used to direct push notifications to the guest's smart device. Flow then proceeds to block 704.

At block 704, the guest may place an order for goods either through the proprietary application, via a web page maintained by the web services component 210, within the retail establishment on a self-service kiosk 300, via a third-party application (e.g., Door Dash or Grubhub) that is coupled to the backend server 200, or wait staff at the establishment may enter the order directly via the touchscreen 304 into a fixed or mobile point-of-sale terminal 300. If entered on a terminal 300, the order initiation component 309 creates an order number and communicates details of the order to the backend server 200. The synchronization component 208 then transmits the order number and details of the order to remaining terminals 300 in the establishment. If entered through the proprietary application or a third-party application, then the order initiation component 209 in the backend server creates an order number along with details of the order and then transmits the order number and details of the order to terminals 300 in the establishment. Flow then proceeds to block 705.

At block 705, concurrent with fulfillment of the placed order, the backend server 200 generates a transaction token that corresponds to the placed order and transmits the token to terminals 300 in the establishment. When prompted to complete the transaction, a corresponding terminal 300 may display the transaction token on its touchscreen 304 for acceptance by the guest. Alternatively, the corresponding terminal 300 may print the transaction token on paper or it may be displayed as a sticker/poster adjacent to the terminal 300 for acceptance by the guest. In one embodiment, the transaction token is unique to the transaction. In another embodiment, the transaction token is static (i.e., the same for all transactions) and the system 200 is configured to associate that transaction token with a current transaction being processed when the transaction token is accepted by the guest's smart device. Flow then proceeds to block 706.

At block 706, the guest accepts the transaction token by employing an application such as a QR code reader or bar code reader. Flow then proceeds to block 707.

At block 707, it is necessary to access the unique device identifier for push notifications from the previously created loyalty record. If any of the previously registered contact information (e.g., name, email address, SMS text number) was employed to create the order, then the handoff component 212 may access the record to retrieve the device identifier without intervention. Otherwise, the guest is required to provide one element of the contact information to a corresponding terminal 300. Via the loyalty record, the handoff component 212 then associates the transaction with the device identifier. Flow then proceeds to block 708.

At block 708, the handoff component 212 in the server 200 employs the device identifier to send content (i.e., a push notification) to the guest's smart device requesting handoff of the transaction to the guest device. Flow then proceeds to block 709.

At block 709, the guest accepts handoff by selecting the push notification, which wakes up the proprietary application for execution on the guest device. The proprietary application then notifies the handoff component 212 that handoff has been accepted. Flow then proceeds to block 710.

At block 710, the handoff component 212 passes control to the guest interface component 215 that transmits content of the transaction, exemplified in the diagram of FIG. 4, that is formatted for display on the guest device within the proprietary application. Thus, the terminal 300 may subsequently be employed to process other orders. Flow then proceeds to block 711.

At block 711, the guest enters a tip amount and payment authorization (e.g., signature and submission), which is communicated by the proprietary application to the backend server 200. Flow then proceeds to block 712.

At block 712, the transaction component 213 processes the payment using the provided payment instrument and messages terminals 300 in the establishment and the proprietary application that payment of the ticket is complete. The transaction component 213 may also transmit an electronic receipt to the proprietary application as a record of the transaction. The receipt may optionally be stored within the proprietary application for reference. The proprietary application may further provide for export of the receipt. Flow then proceeds to block 713.

At block 713, the guest interface component 215 then generates and transmits content to the guest device that allows the guest to provide feedback on the order, as is discussed above. The feedback is then transmitted by the proprietary application to the feedback component 214 of the backend server 200, which determines according to programmed criteria if management attention to the order is warranted. The feedback component 214 additionally may access the tip amount entered by the guest and determine if a tip percentage is above or below a threshold that is programmed into the system by management. The feedback, indication of acceptable tip percentage, and any notes provided by the guest are then transmitted by the feedback component 214 to a feedback component 314 in a terminal 300 in the establishment that is configured for management access as described above. Accordingly, a management representative is immediately alerted to guest dissatisfaction and is provided with options similar to those described with reference to FIG. 5 that may assuage the guest and secure continuing loyalty. Flow then proceeds to block 714.

At block 714, the management representative selects one of the displayed actions or may take another action to address service concerns that were identified by the guest in block 713.

Figure 8:
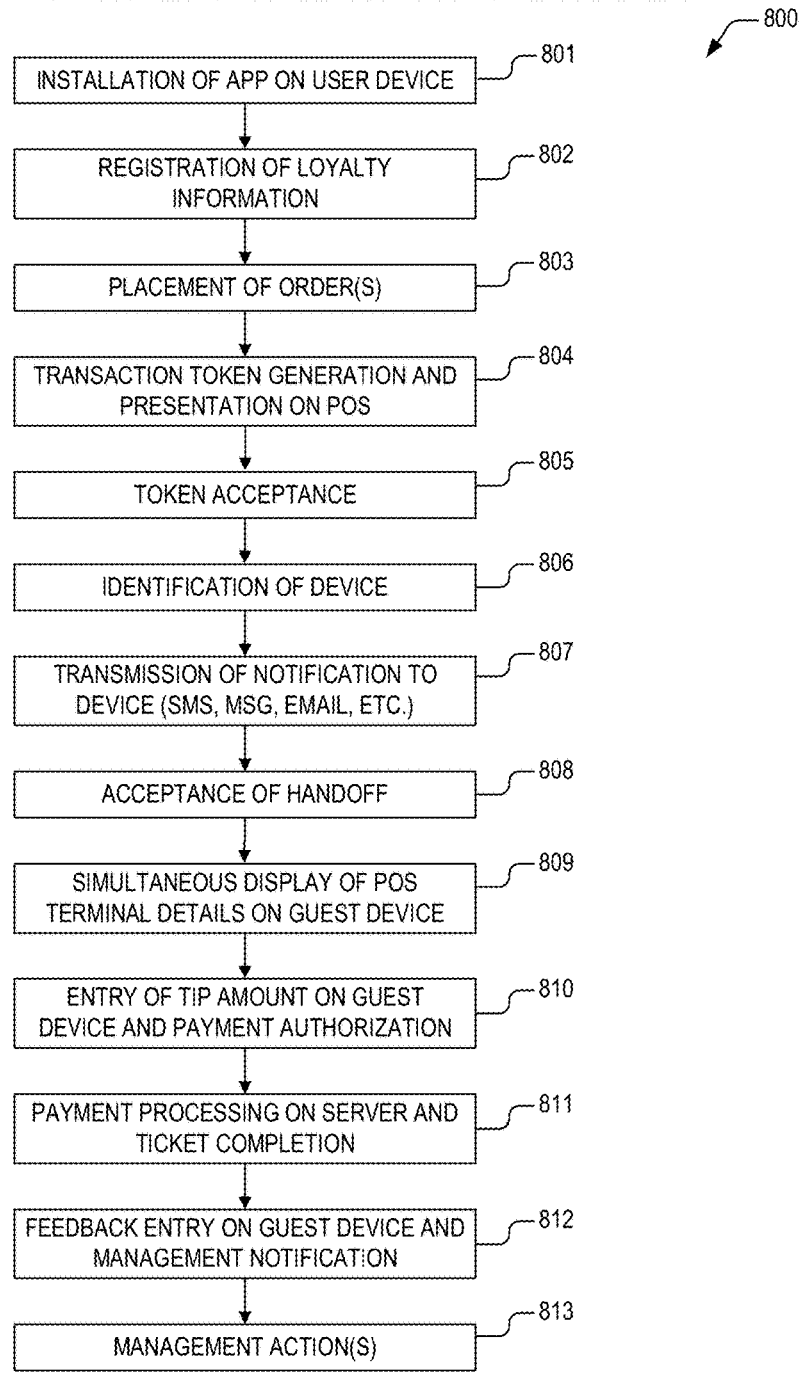
FIG. 8 is a flow diagram detailing another method for handoff of a transaction from a point-of-sale terminal to a guest device, where the handoff is triggered upon acceptance of a payment token by the guest device.

Referring now to FIG. 8, a flow diagram 800 is presented detailing another method for handoff of a transaction from a point-of-sale terminal to a guest device, where the handoff is triggered upon acceptance of a transaction token. This method is employed when a guest has the proprietary application installed on their device but has not registered a payment instrument nor enabled push notifications. Flow begins at block 801 when a guest downloads and installs a proprietary application corresponding to a retail establishment on a smart device that belongs to the guest. Flow then proceeds to block 802.

At block 802, the guest executes that proprietary application on the smart device and the application prompts the guest to enter registration information such as, but not limited to, name, email address, phone number for text messaging, and other forms of contact information (e.g., Facebook Messenger address). The registration information is then transmitted by the proprietary application through the cloud to the backend server 200, which creates a loyalty token for the guest and stores a corresponding loyalty record in the loyalty database 217. Flow then proceeds to block 803.

At block 803, the guest may place an order for goods either through the proprietary application, via a web page maintained by the web services component 210, within the retail establishment on a self-service kiosk 300, via a third-party application (e.g., Door Dash or Grubhub) that is coupled to the backend server 200, or wait staff at the establishment may enter the order directly via the touchscreen 304 into a fixed or mobile point-of-sale terminal 300. If entered on a terminal 300, the order initiation component 309 creates an order number and communicates details of the order to the backend server 200. The synchronization component 208 then transmits the order number and details of the order to remaining terminals 300 in the establishment. If entered through the proprietary application or a third-party application, then the order initiation component 209 in the backend server creates an order number along with details of the order and then transmits the order number and details of the order to terminals 300 in the establishment. Flow then proceeds to block 804.

At block 804, concurrent with fulfillment of the placed order, the backend server 200 generates a transaction token that corresponds to the placed order and transmits the token to terminals 300 in the establishment. When prompted to complete the transaction, a corresponding terminal 300 may display the transaction token on its touchscreen 304 for acceptance by the guest. Alternatively, the corresponding terminal 300 may print the transaction token on paper for acceptance by the guest. In one embodiment, the transaction token is unique to the transaction. In another embodiment, the transaction token is static (i.e., the same for all transactions) and the system 200 is configured to associate that transaction token with a current transaction being processed when the transaction token is accepted by the guest's smart device. Flow then proceeds to block 805.

At block 805, the guest accepts the transaction token by employing an application such as a QR code reader or bar code reader. Flow then proceeds to block 806.

At block 806, because push notifications are not enabled, it is necessary to access the previously created loyalty record to determine an alternative form of contacting the guest device. If any of the previously registered contact information (e.g., name, email address, SMS text number) was employed to create the order, then the handoff component 212 may employ one of the contact addresses to send a message to the guest device via a channel other than a push notification. Otherwise, the guest is required to provide one element of the contact information to a corresponding terminal 300. In one embodiment, channels are employed in the following priority order: SMS message, email message, other messaging application. Via the loyalty record, the handoff component 212 then associates the transaction with a selected/provided contact address. Flow then proceeds to block 807.

At block 807, the handoff component 212 in the server 200 employs the device identifier to send content (e.g., SMS message, email, other message) to the guest's smart device requesting handoff of the transaction to the guest device. Flow then proceeds to block 808.

At block 808, the guest accepts handoff by a link in the received content, which wakes up the proprietary application for execution on the guest device. The proprietary application then notifies the handoff component 212 that handoff has been accepted. Flow then proceeds to block 809.

At block 809, the handoff component 212 passes control to the guest interface component 215 that transmits content of the transaction, exemplified in the diagram of FIG. 4, that is formatted for display on the guest device within the proprietary application. Thus, the terminal 300 may subsequently be employed to process other orders. Flow then proceeds to block 810.

At block 810, the guest enters a tip amount and payment authorization (e.g., signature and submission), which is communicated by the proprietary application to the backend server 200. Flow then proceeds to block 811.

At block 811, the transaction component 213 processes the payment using the provided payment instrument and messages terminals 300 in the establishment and the proprietary application that payment of the ticket is complete. The transaction component 213 may also transmit an electronic receipt to the proprietary application as a record of the transaction. The receipt may optionally be stored within the proprietary application for reference. The proprietary application may further provide for export of the receipt. Flow then proceeds to block 812.

At block 812, the guest interface component 215 then generates and transmits content to the guest device that allows the guest to provide feedback on the order, as is discussed above. The feedback is then transmitted by the proprietary application to the feedback component 214 of the backend server 200, which determines according to programmed criteria if management attention to the order is warranted. The feedback component 214 additionally may access the tip amount entered by the guest and determine if a tip percentage is above or below a threshold that is programmed into the system by management. The feedback, indication of acceptable tip percentage, and any notes provided by the guest are then transmitted by the feedback component 214 to a feedback component 314 in a terminal 300 in the establishment that is configured for management access as described above. Accordingly, a management representative is immediately alerted to guest dissatisfaction and is provided with options similar to those described with reference to FIG. 5 that may assuage the guest and secure continuing loyalty. Flow then proceeds to block 813.

At block 813, the management representative selects one of the displayed actions or may take another action to address service concerns that were identified by the guest in block 812.

Figure 9:
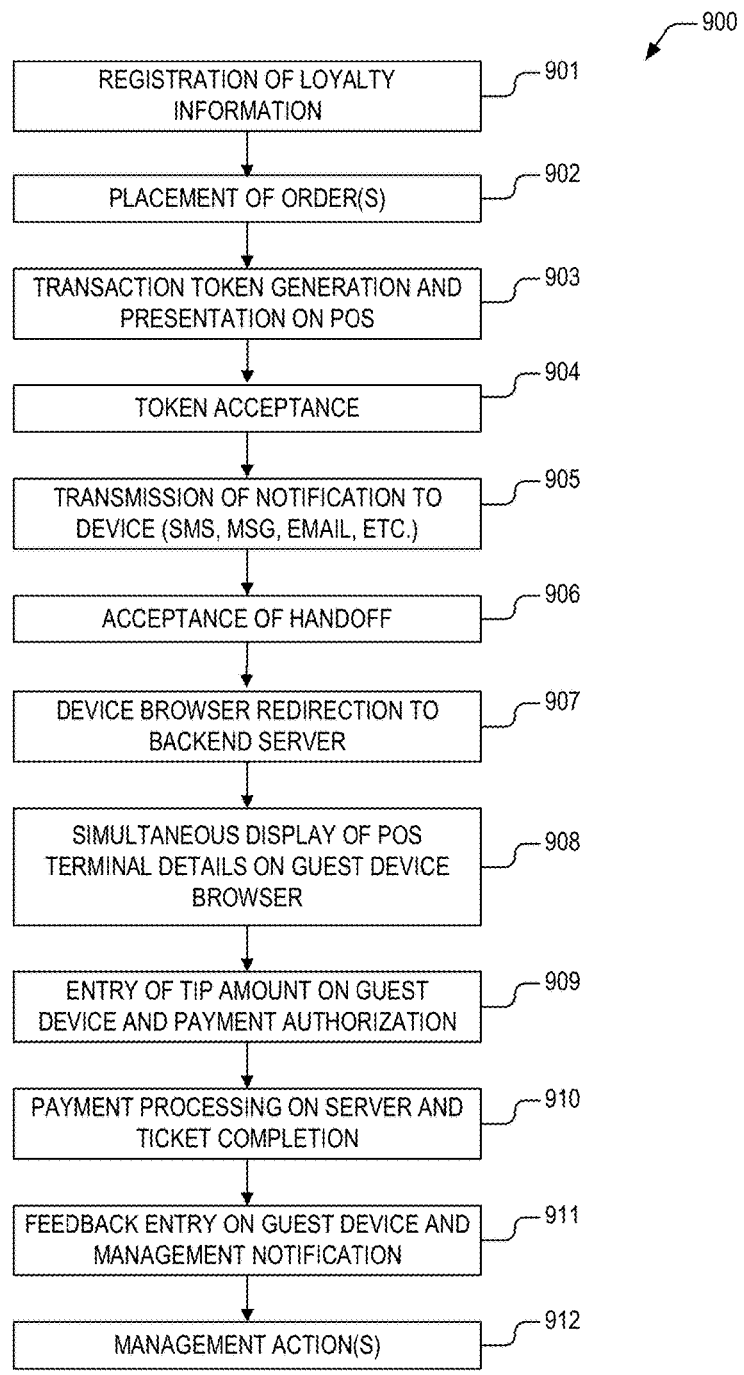
FIG. 9 is a flow diagram detailing a browser-based method for handoff of a transaction from a point-of-sale terminal to a guest device, where the handoff is triggered upon acceptance of a payment token by the guest device.

Finally turning to FIG. 9, a flow diagram 900 is presented showing a further method for a browser-based handoff of a transaction from a point-of-sale terminal to a guest device, where the handoff is triggered upon acceptance of a transaction token. This method is employed when a guest registered a loyalty account with the establishment but has not installed the proprietary application on their smart device. Flow begins at block 801 when a guest accesses a web page for the establishment on their smart device web browser or a web browser from another source (e.g., desktop computer, laptop computer, etc.) that prompts the guest to enter registration information such as, but not limited to, name, email address, phone number for text messaging, and other forms of contact information (e.g., Facebook Messenger address). The registration information is then transmitted from the browser through the cloud to the backend server 200, which creates a loyalty token for the guest and stores a corresponding loyalty record in the loyalty database 217. Flow then proceeds to block 902.

At block 902, the guest may place an order for goods either via a web page maintained by the web services component 210, within the retail establishment on a self-service kiosk 300, via a third-party application (e.g., Door Dash or Grubhub) that is coupled to the backend server 200, or wait staff at the establishment may enter the order directly via the touchscreen 304 into a fixed or mobile point-of-sale terminal 300. If entered on a terminal 300, the order initiation component 309 creates an order number and communicates details of the order to the backend server 200. The synchronization component 208 then transmits the order number and details of the order to remaining terminals 300 in the establishment. If entered through a third-party application, then the order initiation component 209 in the backend server creates an order number along with details of the order and then transmits the order number and details of the order to terminals 300 in the establishment. Flow then proceeds to block 903.

At block 903, concurrent with fulfillment of the placed order, the backend server 200 generates a transaction token that corresponds to the placed order and transmits the token to terminals 300 in the establishment. When prompted to complete the transaction, a corresponding terminal 300 may display the transaction token on its touchscreen 304 for acceptance by the guest. Alternatively, the corresponding terminal 300 may print the transaction token on paper or it may be displayed as a sticker/poster adjacent to the terminal 300 for acceptance by the guest. In one embodiment, the transaction token is unique to the transaction. In another embodiment, the transaction token is static (i.e., the same for all transactions) and the system 200 is configured to associate that transaction token with a current transaction being processed when the transaction token is accepted by the guest's smart device. Flow then proceeds to block 904.

At block 904, the guest accepts the transaction token by employing an application such as a QR code reader or bar code reader that is resident on their smart device. Flow then proceeds to block 905.

At block 905, because the proprietary application is not installed on the guest's smart device, it is necessary to access the previously created loyalty record to determine an alternative form of contacting the guest device. If any of the previously registered contact information (e.g., name, email address, SMS text number) was employed to create the order, then the handoff component 212 may employ one of the contact addresses to send a message to the guest device via a channel other than a push notification. Otherwise, the guest is required to provide one element of the contact information to a corresponding terminal 300. In one embodiment, channels are employed in the following priority order: SMS message, email message, other messaging application. Via the loyalty record, the handoff component 212 then associates the transaction with a selected/provided contact address. Flow then proceeds to block 906.

At block 906, the handoff component 212 in the server 200 employs the device identifier to send content (e.g., SMS message, email, other message) to the guest's smart device requesting handoff of the transaction to the guest device. Flow then proceeds to block 907.

At block 907, the guest accepts handoff by a link in the received content, which redirects a browser on the guest device to a handoff web page provided by web services component 210. The web services component 210 then notifies the handoff component 212 that handoff has been accepted. Flow then proceeds to block 908.

At block 908, the handoff component 212 passes control to the guest interface component 215 that transmits content of the transaction, exemplified in the diagram of FIG. 4, that is formatted for display via the browser on the guest device.

Thus, the terminal 300 may subsequently be employed to process other orders. Flow then proceeds to block 909.

At block 909, the guest enters a tip amount and payment authorization (e.g., signature and submission), which is communicated by the browser to the backend server 200. Flow then proceeds to block 910.

At block 910, the transaction component 213 processes the payment using the provided payment instrument and messages terminals 300 in the establishment and the proprietary application that payment of the ticket is complete. The transaction component 213 may also transmit an electronic receipt to the proprietary application as a record of the transaction. The receipt may optionally be stored within the proprietary application for reference. The proprietary application may further provide for export of the receipt. Flow then proceeds to block 911.

At block 911, the guest interface component 215 then generates and transmits content to the guest device browser that allows the guest to provide feedback on the order, as is discussed above. The feedback is then transmitted to the feedback component 214 of the backend server 200, which determines according to programmed criteria if management attention to the order is warranted. The feedback component 214 additionally may access the tip amount entered by the guest and determine if a tip percentage is above or below a threshold that is programmed into the system by management. The feedback, indication of acceptable tip percentage, and any notes provided by the guest are then transmitted by the feedback component 214 to a feedback component 314 in a terminal 300 in the establishment that is configured for management access as described above. Accordingly, a management representative is immediately alerted to guest dissatisfaction and is provided with options similar to those described with reference to FIG. 5 that may assuage the guest and secure continuing loyalty. Flow then proceeds to block 912.

At block 912, the management representative selects one of the displayed actions or may take another action to address service concerns that were identified by the guest in block 911.

Portions of the present invention and corresponding detailed description are presented in terms of software or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A method for handoff of a transaction for completion, the method comprising:

via a point-of-sale (POS) terminal, reading a payment instrument that is presented by a user of a guest device as payment for the transaction, transmitting the payment instrument to a server, receiving a transaction token from the server that corresponds to the transaction, and presenting the transaction token which is configured to be accepted by the user of the guest device; and via the server, in response to receiving the payment instrument, generating the transaction token that is configured to be accepted by the user of the guest device, and, upon acceptance of the transaction token by the user of the guest device, transmitting communications to the POS terminal and to the guest device, wherein the communications are configured to cause the POS terminal and the guest device to simultaneously display a same content of POS data for the transaction, receiving transaction completion details from the guest device, and transmitting a notice to the POS terminal that the transaction is complete.

2. The method as recited in claim 1, wherein the server sends a push notification to the guest device upon reception of the payment instrument, the push notification directing the guest device to launch a proprietary application that communicates directly with the server and through which the POS data for the transaction is displayed and the transaction completion details are entered.

3. The method as recited in claim 2, wherein the payment instrument comprises a credit card number and credit card holder name.

4. The method as recited in claim 2, wherein the payment instrument comprises a gift card number and gift card holder name, wherein the gift card number has been previously issued by the server.

5. The method as recited in claim 1, wherein the guest device comprises a smart phone.

6. The method as recited in claim 5, wherein the transaction token comprises a QR code and wherein acceptance of the transaction token by the user of the guest device comprises scanning the QR code using a QR code reading application executing on the guest device.

7. The method as recited in claim 5, wherein the transaction token comprises a bar code and wherein acceptance of the transaction token by the user of the guest device comprises scanning the bar code using a bar code reading application executing on the guest device.

8. A non-transitory computer-readable storage medium storing program instructions that, when executed by a computer, cause the computer to perform a method for handoff of a transaction for completion, the method comprising:
via a point-of-sale (POS) terminal, reading a payment instrument that is presented by a user of a guest device as payment for the transaction, transmitting the payment instrument to a server, receiving a transaction token from the server that corresponds to the transaction, and presenting the transaction token which is configured to be accepted by the user of the guest device; and
via the server, in response to receiving the payment instrument, generating the transaction token that is configured to be accepted by the user of the guest device, and, upon acceptance of the transaction token by the user of the guest device, transmitting communications to the POS terminal and to the guest device, wherein the communications are configured to cause the POS terminal and the guest device to simultaneously display a same content of POS data for the transaction, receiving transaction completion details from the guest device, and transmitting a notice to the POS terminal that the transaction is complete.

9. The non-transitory computer-readable storage medium as recited in claim 8, wherein the server sends a push notification to the guest device upon reception of the payment instrument, the push notification directing the guest device to launch a proprietary application that communicates directly with the server and through which the POS data for the transaction is displayed and the transaction completion details are entered.

10. The non-transitory computer-readable storage medium as recited in claim 9, wherein the payment instrument comprises a credit card number and credit card holder name.

11. The non-transitory computer-readable storage medium as recited in claim 9, wherein the payment instrument comprises a gift card number and gift card holder name, wherein the gift card number has been previously issued by the server.

12. The non-transitory computer-readable storage medium as recited in claim 8, wherein the guest device comprises a smart phone.

13. The non-transitory computer-readable storage medium as recited in claim 12, wherein the transaction token comprises a QR code and wherein acceptance of the transaction token by the user of the guest device comprises scanning the QR code using a QR code reading application executing on the guest device.

14. The non-transitory computer-readable storage medium as recited in claim 12, wherein the transaction token comprises a bar code and wherein acceptance of the transaction token by the user of the guest device comprises scanning the bar code using a bar code reading application executing on the guest device.

15. A system for handoff of a transaction for completion, the system comprising:
a point-of-sale (POS) terminal, configured to read a payment instrument that is presented by a user of a guest device as payment for the transaction, and configured to transmit said payment instrument to a server, and configured to receive a transaction token from said server that corresponds to the transaction, and configured to present said transaction token for acceptance by said user of said guest device; and
said server, in response to receiving said payment instrument, configured to generate said transaction token that is configured to be accepted by the user of the guest device, and, upon acceptance of said transaction token by said user of said guest device, configured to transmit communications to said POS terminal and to said guest, wherein said communications are configured to cause said POS terminal and said guest device to simultaneously display a same content of POS data for the transaction, and configured to receive transaction completion details from said guest device, and configured to transmit a notice to said POS terminal that the transaction is complete.

16. The system as recited in claim 15, wherein said server sends a push notification to said guest device upon reception of the payment instrument, said push notification directing said guest device to launch a proprietary application that communicates directly with said server and through which said POS data for the transaction is displayed and said transaction completion details are entered.

17. The system as recited in claim 16, wherein said payment instrument comprises a credit card number and credit card holder name.

18. The system as recited in claim 16, wherein said payment instrument comprises a gift card number and gift card holder name, wherein said gift card number has been previously issued by said server.

19. The system as recited in claim 15, wherein the guest device comprises a smart phone.

20. The system as recited in claim 19, wherein said transaction token comprises a QR code and wherein acceptance of said transaction token by said user of said guest device comprises scanning said QR code using a QR code reading application executing on said guest device.

* * * * *